United States Patent
Skalsey

[15] 3,670,625
[45] June 20, 1972

[54] POT BROACHING MACHINE

[72] Inventor: Lily G. Skalsey, Detroit, Mich.

[73] Assignee: Lear Siegler, Inc., Santa Monica, Calif.

[22] Filed: Oct. 15, 1970

[21] Appl. No.: 80,951

[52] U.S. Cl. .......................................... 90/86, 90/71, 90/79
[51] Int. Cl. ................................................. B23d 41/06
[58] Field of Search ........................ 90/71, 73, 76, 77, 79, 86

[56] References Cited

UNITED STATES PATENTS 2,051,086   8/1936   Johnson ..................................... 90/86

*Primary Examiner*—Gerald A. Dost
*Attorney*—Whittemore, Hulbert & Belknap

[57] ABSTRACT

A pot broach comprising an upright frame including a vertical broach adjacent the upper end of the frame. A piston and cylinder device is disposed below the broach and a work holder is provided on the upper end of the piston. Automatic loading mechanism slides a work piece into position above the work support on the piston. Guide means retains the work piece accurately located until it enters into the lower end of the broach.

9 Claims, 4 Drawing Figures

PATENTED JUN 20 1972

INVENTOR.
Lily G. Skatsey.
BY Whittemore,
Hulbert & Belknap
ATTORNEYS

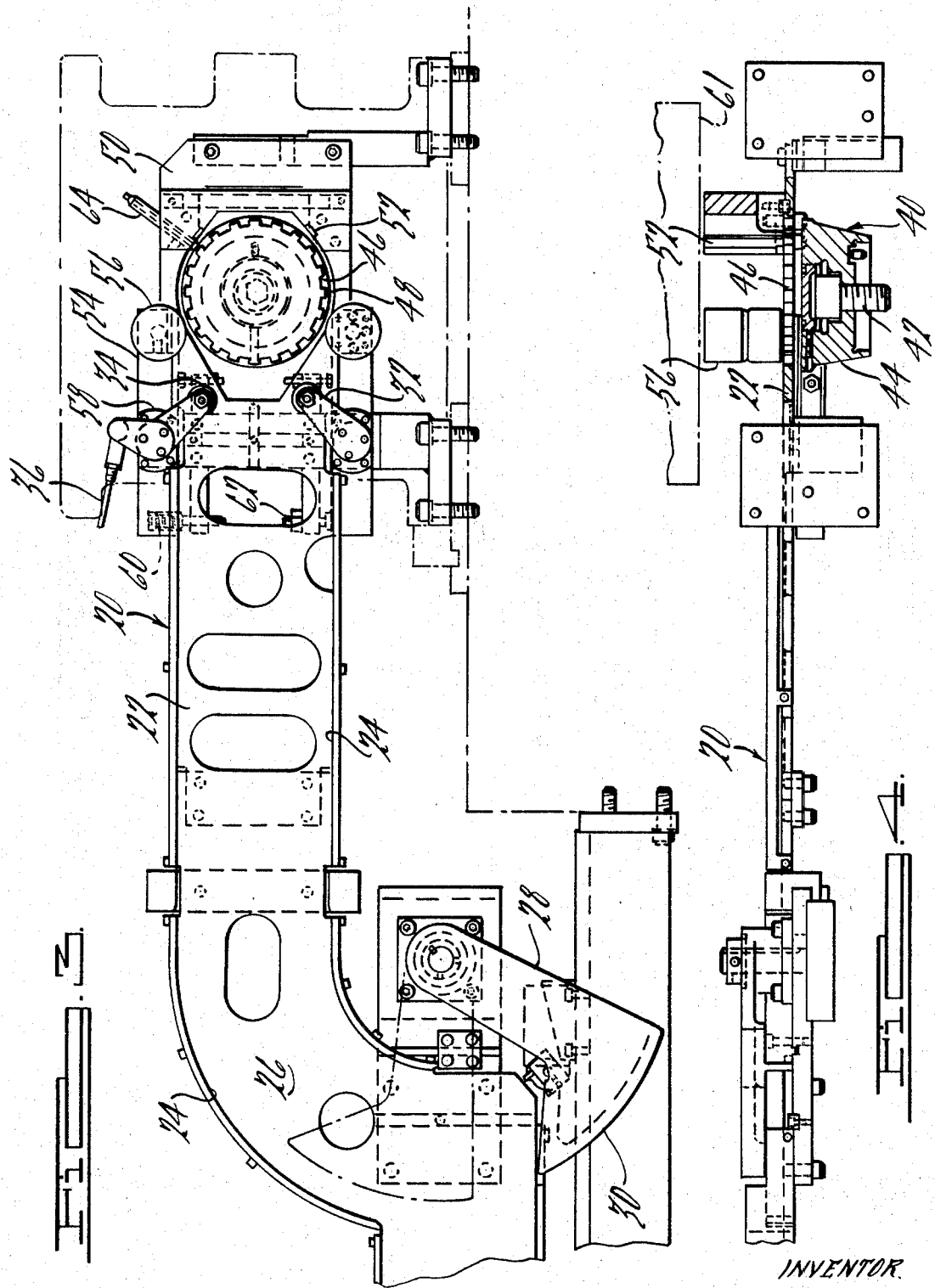

3,670,625

POT BROACHING MACHINE

BRIEF SUMMARY OF THE INVENTION

The present invention relates to a vertical pot broach for broaching teeth on the periphery of a circular work piece.

The machine comprises a vertical frame having a broach holder adjacent its upper end adapted to retain a pot broach in fixed position with its axis vertical. Located directly below the broach is an elongated vertical cylinder in which a piston is vertically slidable. The piston connects to a piston rod which extends upwardly above the cylinder and which at its upper end carries a work support.

Automatic loading equipment advances work pieces into position directly above the work support on the upper end of the piston. Spring-urged rollers and vertically extending carbide guide means guides a work piece as it is elevated vertically upon energization of the cylinder into engagement with the lower end of the broach.

The work support comprises a peripherally toothed plate, the teeth being adapted to pass through the internally toothed broach without engagement with the cutting edges thereof. The work piece is cut to fully toothed shape during its passage through the broach and may be readily removed from the work support after the work support has emerged from the upper end of the broach.

Since the work piece, which is ordinarily of annular shape, does not have any locating or supporting means extending into its central holder, it may be removed after completion of the broaching operation simply by sliding it laterally into a chute or the like.

BRIEF DESCRIPTION OF THE DRAWINGS

FIG. 3 is a plan view showing details of the automatic loading support.

FIG. 4 is an elevational view, in section, of the loading equipment.

DETAILED DESCRIPTION

Figure 1:
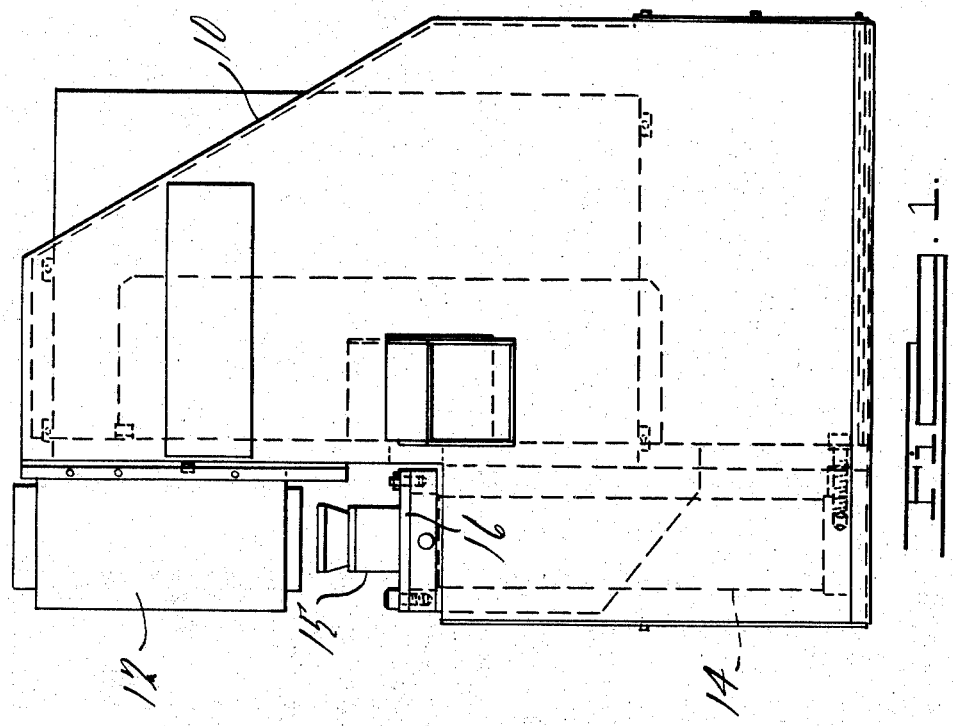
FIG. 1 is a side elevation of the broaching machine.
Figure 2:
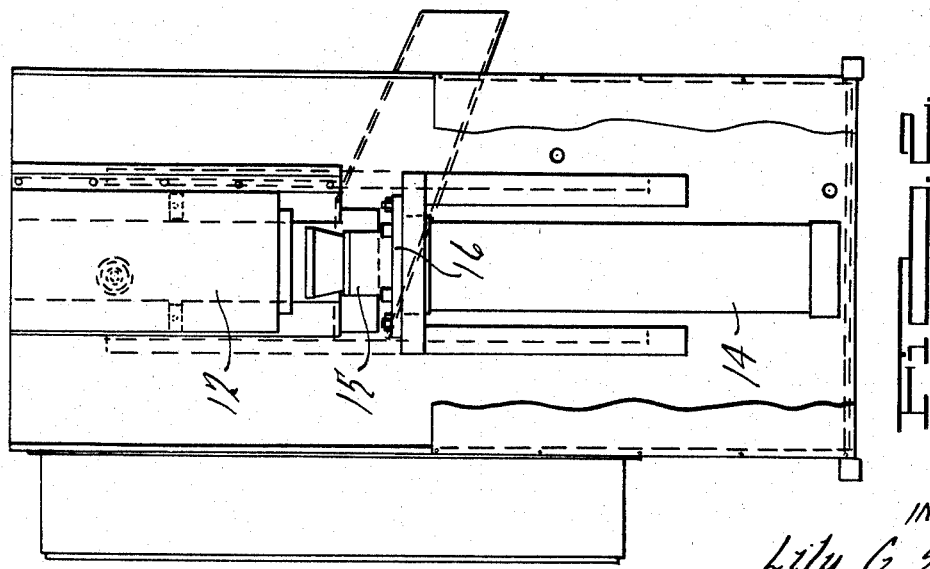
FIG. 2 is a front elevation of the machine.

Referring now to the drawings and particularly FIGS. 1 and 2, the broaching machine comprises a generally vertically extending frame 10 of heavy, rigid construction which is provided adjacent its upper end and projecting forwardly from the front of the machine with a broach holder 12. Within the holder 12 is a pot broach, details of which form no part of the present invention. However, it is noted that the broach may be in the form of a multiplicity of rings assembled together within a casing composed of a pair of meeting channel members. The cutting teeth of the broach face downwardly and are adapted to machine peripheral teeth on a circular and ordinarily annular work piece as the work piece is pushed upwardly through the broach.

Within the forward lower part of the machine frame is an elongated vertically disposed cylinder 14 which is provided with a piston connected to an upwardly extending piston rod 15 which extends above a ledge 16 on the upper end of the portion of the frame housing the cylinder 14 and which carries work supporting means, as will be subsequently described.

Due to the length of the cylinder, it will be appreciated that it accurately guides the piston and that the accuracy is particularly effective during the initial portion of the upward stroke as a work piece is brought into operating relationship with respect to the broach.

Referring now more particularly to FIGS. 3 and 4, there is shown the equipment which effects automatic loading of work pieces in order to increase production. Essentially, the automatic loading fixture, indicated in its entirety at 20, comprises a horizontal trackway 22 provided with guide strips 24 at its edge. The trackway includes an arcuate portion 26 associated with a swinging arm 28 which is adapted to engage a circular work piece while the arm 28 is in the full line position as shown in FIG. 3. Means are provided for swinging the arm through a substantial area so as to advance a work piece around the curved portion 26 of the track. A series of work pieces may be in abutment and urged toward the loading station. The foremost of these is moved laterally by the arm 28 and the curved portion 30 of the arm constitutes a stop which prevents forward movement of the remaining blanks or work pieces until the arm returns to the full line position.

Means are provided for limiting forward movement of the work pieces to the loading station and this means comprises a pair of arms 32 having rollers 34 and including operating linkage 36 which is adapted to retract the rollers to permit passage of the foremost work pieces into the loading station and to prevent encroachment of the next succeeding work piece until the next operation of the swinging feed arm 28.

A loading station is constituted essentially by work support structure indicated generally at 40 adapted to be secured to the upper end of the piston by suitable means such as, for example, the screw 42. The work support means comprises a body 44 to the upper end of which is secured a work support plate 46 having peripheral teeth 48 shaped to pass through the cutting teeth of the broach without engagement. The plate 46 is accordingly supported on the body 44 with its teeth located in line with the spaces between the broach teeth. As a new work piece is advanced on to the work support plate 46 it is accurately located thereon and as the work support is elevated to move the work piece into engagement with the broach the work piece is accurately maintained in properly located position. This is accomplished by providing an abutment block 50 having vertically extending guide elements 52, which may, for example, be elongated carbide strips. A pair of spring-operated arms 54 are provided, each of which has a work engaging roller 56 at one end thereof. The arms are mounted intermediate their ends on vertical pivots indicated at 58. Compression springs 60 are received in pockets formed at the ends of the arms 54 opposite to the rollers 56 and engage adjustable abutment screws 62 which bias the rollers 56 inwardly toward each other. As a work piece is forced by the feed arm 28 to advance on to the work support plate 46 it passes between the spring-pressed rollers 56 which serve to urge the work piece into locating engagement with the locating strips 52 as the major diameter of the work piece passes the rollers 56.

Thereafter, fluid pressure is admitted to the bottom of the cylinder and the piston and piston rod is forced upwardly. During the upward movement of the work support 40 the work piece, which is otherwise freely slidable on the work support plate 46, is accurately guided during its initial upward movement of sliding engagement with the two rollers 56 and the two guide plates 52.

In FIG. 4 the location of the bottom of the broach is indicated by the dot and dash line 60 and it will be apparent that the guide means 52 and 56 is effective to maintain the work piece in accurately guided relation until its upper end enters into the opening in the broach. Thereafter as the work piece is advanced upwardly through the broach it is guided by its engagement with the accurately formed teeth on the broach. When the work support 40 pushes the completed work piece above the upper end of the broach support 12, it will be apparent that the finished work piece is supported on the plate 46 for sliding movement. Accordingly, the finished workpiece may be removed directly from the support and conveniently this removal may be accomplished by simply pushing the finished work piece laterally off the work support plate 46 into a discharged chute.

What I claim as my invention is:

1. A vertical pot broaching machine for broaching peripherally toothed parts, comprising a frame having adjacent its top a pot broach holder, a vertically disposed piston and cylinder device below said broach holder in alignment therewith, a flat work support plate on the upper end of said piston on to which a work blank is slidable, guide means disposed laterally of said plate and extending vertically between the lowermost loading position of said plate and the underside of said broach holder to locate a work piece initially in proper position on said plate and to maintain it in proper position during movement into engagement with the broach, said piston and cylinder device being operable to push a work piece upwardly completely through said broach support and to provide for removal of the finished part by lateral sliding movement.

2. A machine as defined in claim 1 in which said work support plate is peripherally toothed in conformity with the part to be broached.

3. A machine as defined in claim 2, in which the teeth on said plate pass through the tooth spaces in the broach without contact.

4. A machine as defined in claim 1, comprising a horizontal trackway along which a succession of blank work pieces are advanced in an edge abutting series, said trackway having an arcuate portion, and a feed arm swingable along said trackway at said arcuate portion.

5. A machine as defined in claim 1, comprising a horizontal trackway along which a succession of blank work pieces are advanced in an edge abutting series, a pair of spring-urged rollers past which the foremost work piece advances onto said work support plate effective to bias the workpiece into accurately located position against part of said guide means.

6. A machine as defined in claim 5, in which said rollers are vertically elongated and constitute a part of said guide means.

7. A machine as defined in claim 6, in which the part of said guide means against which the work pieces are located comprise vertically extending hard guide elements.

8. A machine as defined in claim 7, in which said strips are carbide strips.

9. A machine as defined in claim 5, comprising a pair of stop rollers operable to prevent advance of a successive work piece during loading and broaching of the preceding work piece.

* * * * *